United States Patent Office 3,585,167
Patented June 15, 1971

3,585,167
POLYISOCYANATE COATING COMPOSITIONS
Herbert Naarmann, Ludwigshafen, Heinrich Hartmann, Limburgerhof, Matthias Marx, Bad Durkheim, and Kurt Schneider, Limburgerhof, Germany, assignors to Badische Anilin- & Soda-Fabrik Aktiengesellschaft, Ludwigshafen (Rhine), Germany
No Drawing. Filed Dec. 9, 1968, Ser. No. 782,455
Claims priority, application Germany, Dec. 8, 1967, P 16 21 823.8
Int. Cl. C08g 22/04, 22/16
U.S. Cl. 260—77.5                        7 Claims

ABSTRACT OF THE DISCLOSURE

Coatings prepared by reaction of polyisocyanates with copolymers containing hydroxyl groups and polymerized units of unsaturated thioglycol ethers.

The present invention relates to coatings prepared by the reaction of polyisocyanates with copolymers which contain hydroxyl groups and polymerized units of unsaturated thioglycol ethers.

It is known that coatings can be prepared by reaction of polyisocyanates with polymers containing hydroxyl groups. The polymers containing hydroxyl groups according to U.S. Pat. No. 3,222,322 are generally polyesters of dibasic carboxylic acids and trihydric alcohols or mixtures of dihydric and trihydric alcohols, particularly saturated branched polyesters. It is also known that polymers containing hydroxyl groups and copolymers can be used together with polyisocyanates as coating materials for the production of coatings. Copolymers containing ethylene glycol moonacrylate or butanediol monoacrylate are used as polymers containing hydroxyl groups for the said purpose. The presence of small amounts of diacrylates (which have a crosslinking effect) which can scarcely be avoided causes difficulties. Allyl alcohol has also already been used as a comonomer which produces lateral hydroxyl groups in the finished polymer. Allyl alcohol does not polymerize well however and cannot be introduced in polymerized form in sufficiently large amounts for some applications.

The object of this invention is to provide novel coatings which are resistant to water and organic solvents. Another object of the invention is to provide a process for the production of coating compositions having a prolonged pot life which give coatings having a short drying time and further advantageous properties.

We have found that the said objects are achieved and coatings having particularly advantageous properties are obtained by reacting polyisocyanates with copolymers containing hydroxyl groups which contain polymerized units of 1 to 35% by weight of an unsaturated thioglycol ether having the formula:

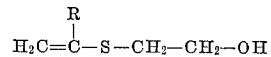

in which R denotes a hydrogen atom or a methyl or vinyl group.

These unsaturated thioglycol ethers can be readily prepared by reaction of acetylene, propyne or butenyne with monothioglycol on an industrial scale and without a content of crosslinking substances. Where R is a vinyl group, the compound can be prepared by adding β-mercapto ethanol to butenyne.

The unsaturated thioglycol ethers are used in amounts of from 1 to 35%, preferably 5 to 25%, with reference to the total amount by weight of copolymer, with 99 to 65%, preferably 95 to 75%, by weight of other copolymerizable ethylenically unsaturated compounds.

Examples of suitable ethylenically unsaturated compounds which may be copolymerized with the thioglycol ethers are acrylic or methacrylic esters, particularly those having one to eighteen, preferably one to eight, carbon atoms in the alcohol radical, for example acrylic or methacrylic esters of methanol, ethanol, butanol or 2-ethylhexanol, nitriles such as acrylonitrile or methacrylonitrile, styrene, substituted styrenes, olefins such as butadiene or ethylene, vinyl ethers such as methyl vinyl ether, vinyl esters such as for example vinyl acetate, vinyl halides such as vinyl chloride or vinylidene chloride, acrylamide and methacrylamide and their N-substitution products such as N-methylolacrylamide, N-methylolmethacrylamide or their ethers such as N-methylolacrylamide butyl ether. The compounds may naturally also be used mixed with each other with the unsaturated thioglycol ethers in any relative proportions within the said range for the copolymerization but certain mixtures have proved to be particularly suitable for some applications.

For example in order to obtain particularly hard coatings it is advantageous to use monomers, such as styrene, methyl methacrylate or acrylonitrile, which form hard homopolymers. Similarly the amount of monomers containing hydroxyl gorups may also be varied within the said range depending on the purpose for which the product is to be used, and the hardness of the coating can be predetermined. In special cases the copolymers may contain a limited number of other groupings which will react with isocyanates under the reaction conditions, for example carboxyl groups.

The copolymers to be crosslinked according to this invention may be prepared for example in a conventional way by copolymerization of the monomers in a suitable solvent. Conventional polymerization catalysts may be used, for example organic peroxides, redox catalysts or— with special advantage—azo compounds, particulary azoisobutyronitrile.

Organic solvents conventionally used in the surface coatings industry may be used for the polymerization provided they are inert to isocyanates, i.e. do not contain active hydrogen atoms. Examples of suitable solvents of this type are aliphatic esters such as ethyl glycol acetate or ethyl acetate, aromatic hydrocarbons such as xylene or toluene, and ketones such as cyclohexanone. It may be advantageous to use mixtures of solvents for some purposes.

In order to obtain copolymers having suitable molecular weights, organic compounds containing sulfur such as sulfides of the type of dialkylxanthic disulfides and thiol compounds as for example dodecylmercaptan, tert.-dodecylmercaptan and mercaptoethanol are usually added as regulators. Diisopropylxanthic disulfide is a preferred regulator and it is generally used in amounts of 0.5 to 4% by weight with reference to the monomers. The amount of this additive depends in the known manner on the desired viscosity of the copolymer to be used later in the coating composition and which can be characterized by a K value (according to Fikentscher) of from 10 to 25, particularly 12.5 to 22.5. In special cases the specified limits may be undershot or overshot to a certain extent. The amount of regulator added depends also on the monomers used because a higher content of, for example, styrene or methyl methacrylate causes a higher viscosity of the copolymer, while a higher content of, for example, tert.-butyl acrylate or n-butyl acrylate causes a lower viscosity of the copolymer. The thioglycol ethers to be used according to this invention also have the effect of regulating molecular weight to a certain extent.

Examples of polyisocyanates which are suitable for crosslinking the copolymers are aromatic or aliphatic diisocyanates and polyisocyanates such as toluylene diisocyanate, hexamethylene diisocyanate and adducts of polyalcohols and diisocyanates which have free isocyanate groups. The adduct of 1,1,1-trimethylolpropane and 3 moles of toluylene diisocyanate, and also N,N′,N″-tris-(isocyanatohexyl)-biuret are also suitable.

Compounds known as blocked polyisocyanates such as isocyanate adducts to phenols or C—H acid compounds, or compounds containing "uretidine dione"-groups which react like isocyanates at elevated temperature may be used instead of the free polyisocyanates.

Reaction of the polyisocyanates with the said copolymers containing hydroxyl groups may be carried out in the usual way, the polyisocyanates being used in about equivalent amounts to the hydroxyl groups in the copolymer. A deficiency or excess of one reaction component may be advantageous however depending on the particular application. For example if the hydroxyl component is used in excess (up to about 40 mole percent with reference to the amount of reactive isocyanate groups) the crosslinking is not so strong and accordingly more resilient products are obtained. If on the other hand the polyisocyanate is used in excess (up to about 50 mole percent) an additional crosslinking takes place via urea groups by the action of atmospheric humidity. Harder coatings are obtained and these of course are not so resilient.

The polyisocyanates may be added direct (if they are liquid) or in the form of solutions in inert organic solvents to the solution of the copolymer. Other components of coating compositions, for example heat-curable urea-formaldehyde resins, melamine-formaldehyde resins, phenol resins, epoxide resins or other polymers, may be added to achieve certain effects.

The coatings, applied as mixtures of copolymer components and polyisocyanate components, can be cured at room temperature. It is often advantageous however to effect curing at elevated temperatures, for example in the range of temperature from about 100° to 160° C., particularly when using blocked isocyanates or, for example, when other heat-curable resins have been added. The time required for curing can be greatly shortened by the use of elevated temperature. Curing can also be accelerated by adding the usual catalysts for reactions of the isocyanate group, for example tertiary amines such as triethylenediamine or tin compounds as for example dibutyl tin dilaurate.

Coating compositions or coatings prepared by reaction of polyisocyanates with certain special copolymers in accordance with this invention are distinguished by high resistance to hydrolysis, a very good white shade and considerable hardness. As compared with prior art coating compositions based on oxyalkyl acrylate copolymers and polyisocyanates, the coating compositions according to this invention have shorter drying times and a longer pot life and better resistance to water and fuels. Another advantage is that the thioglycol ethers as comonomers yielding hydroxyl groups in accordance with this invention provide the necessary content of hydroxyl groups in the copolymer in smaller amounts (owing to their lower molecular weight) than the corresponding oxyalkyl acrylates which moreover tend to crosslink prematurely so that cheaper coating compositions can be prepared therewith.

The coating compositions according to this invention may be used for coating metals, for example iron, aluminum or alloys of the same, and also for producing coatings on cellulosic materials, glass, ceramics or plastics.

The invention is illustrated by the following examples. The parts specified in the examples are parts by weight. The K values given have been determined by the method of H. Fikentscher (Cellulosechemie, 13, 58 (1932)) by viscosity measurements in 2% solutions of the copolymers in dimethylformamide. The hydroxyl numbers (OH numbers) given are calculated and relate to the resin free from solvent.

EXAMPLE 1

Production of a copolymer

About one third of a mixture of 45 parts of S-vinylthioglycol, 75 parts of styrene, 180 parts of tert.-butylacrylate, 9 parts of diisopropylxanthic disulfide, 3 parts of azoisobutyronitrile in 162 parts of ethyl glycol acetate is heated to 90° to 95° C. in a polymerization vessel while stirring and excluding oxygen. After the polymerization has begun, the remainder of the mixture is added during the course of fifty minutes. The temperature of the polymerization mixture is then kept at 95° C. for another eight hours and 3 parts of azoisobutyronitrile is added after one hour, three hours and five hours. A 64.7% solution is obtained having a K value of 15.9 and an OH number of 81.

(a) 100 parts of the copolymer solutions prepared as described above is mixed with 30 parts of a 75% solution of a reaction product of 3 moles of 2,4-toluylene diisocyanate and 1 mole of trimethylolpropane in ethyl acetate and with 30 parts of ethyl glycol acetate and the mixture is brushed onto rustfree iron sheeting. High gloss coatings are obtained which are dry after just under an hour. After one day at room temperature, the coatings have a pendulum hardness according to König (DIN 53,-157) of 152 seconds and after seven days a pendulum hardness of 186 seconds and an Erichsen number of 8.8. A coating having a pendulum hardness of 190 seconds and an Erichsen number of 9.8 is obtained after baking for one hour at 150° C.

(b) 100 parts of copolymer solution prepared as described above has added to it 24 parts of a 75% solution of N,N′,N″-tris-(isocyanatohexyl)-biuret in a solvent mixture of equal parts of ethyl glycol acetate and xylene, diluted witth 35 parts of ethyl glycol acetate and brushed onto rustfree sheet iron as a clear varnish. Coatings having a good flow are obtained which are tackfree after about one hour and after seven days have a pendulum hardness of 196 seconds and an Erichsen number of 9.3. The corresponding coatings obtained by baking for an hour at 150° C. have a pendulum hardness according to König of 186 seconds and an Erichsen number of 8.4.

(c) 200 parts of the copolymer solution is ground with 50% of rutile (with reference to the total binder content) after the addition of 150 parts of a mixture of equal parts by volume of ethyl glycol acetate and toluene. Half of the mixture is mixed with 30 parts of the polyisocyanate specified under (a) and the other half with 24 parts of the polyisocyanate specified under (b) and applied to sheets of glass and rustfree iron sheeting.

For comparison, a copolymer, is prepared by the method in Example 1 but containing the following monomers instead of the monomers specified in Example 1:

61.5 parts of butanediol-1,4 monoacrylate, 75 parts of styrene and 163.5 parts of tert.-butyl acrylate, A 64.5%. solution is obtained having a K value of 15.5 and an OH number of 80. Pigmentation, combination with polyisocyanate and method of operation are as described above under 1(c). The following tests are made:

Drying time (to determine the drying time at 20° C., the time is measured after which sand has been applied in a uniform thin layer to a surface which has been coated with the composition to be tested no longer sticks to the surface of the coating), pendulum hardness and Erichsen number as well as the resistance of the coating to fuel and water. The results are collected in the following table in which:

Column A gives results obtained with the copolymer according to Example 1 with the polyisocyanate under 1(a);

Column B gives the results obtained with the copolymer according to the comparative example with the polyisocyanate under 1(a);

Column C gives the results obtained with the copolymer according to Example 1 using the polyisocyanate under 1(b); and Column D gives the results obtained with the copolymer according to the comparative example and the isocyanate according to Example 1(b).

The fuel used in the resistance to fuel test is a mixture of equal parts of gasoline, benzene and ethanol; the results in this test and in the resistance to water test indicate behavior after being tested for three weeks at room temperature, 1 denoting very good resistance and 5 denoting very poor resistance.

TABLE

|  | A | B | C | D |
|---|---|---|---|---|
| Tack-free drying time in hours | 1.75 | 2.25 | 2.5 | 7.5 |
| Dry-through time | 5 | 7 | 16 | 21 |
| Pendulum hardness in seconds after: | | | | |
| Twenty days at room temperature | 140 | 120 | 129 | 118 |
| 15 hours at 60° C | 169 | 155 | 175 | 162 |
| Erichsen number after: | | | | |
| Eight days at room temperature | 8.7 | 8.6 | 9.7 | 9.6 |
| 15 hours at 60° C | 8.8 | 8.8 | 10.1 | 10.0 |
| Resistance to fuel | 3 | 5 | 3 | 4–5 |
| Resistance to water | 1 | 2 | 1 | 2 |

EXAMPLE 2

A mixture of 60 parts of S-vinylthioglycol, 60 parts of styrene, 180 parts of methyl methacrylate, 3 parts of diisopropylxanthic disulfide and a total of 12 parts of azoisobutyronitrile in 200 parts of xylene is copolymerized at 95° to 100° C. as described in Example 1 and a 59.8% solution of a copolymer having a K value of 21.4 and an OH number of 107 is obtained.

100 parts of copolymer solution is ground with 50% of rutile, after adding 100 parts of mixture of equal parts by volume of ethyl glycol acetate and toluene, and mixed with 29.4 parts of a 75% solution of N,N',N''-tris-(isocyanatohexyl)-biuret. The coating composition obtained is sprayed onto sheet iron. Glossy coatings are obtained which are tackfree after about two and a half hours and have a pendulum hardness of 121 seconds and an Erichsen number of 9.0 after seven days.

EXAMPLE 3

A mixture of 45 parts of S-vinylthioglycol, 60 parts of tert.-butyl acrylate and 195 parts of n-butyl acrylate, 9 parts of diisopropylxanthic disulfide, a total of 12 parts of azoisobutyronitrile in 162 parts of ethyl glycol acetate is copolymerized as described in Example 1 and a 64.4% solution of a copolymer having a K value of 13.6 and an OH number of 81 is obtained.

100 parts of the copolymer solution is mixed with 30.4 parts of a 75% solution of 2,4-toluylene diisocyanate, diluted with 40 parts of toluene and brushed as a clear coating onto rustfree iron sheeting. High gloss coatings having a good flow are obtained which are tackfree after two hours and have a pendulum hardness of 92 seconds and an Erichsen number of 8.0 after seven days.

EXAMPLE 4

A mixture of 45 parts of S-vinylthioglycol, 117 parts of tert.-butyl acrylate, 15 parts of vinyl acetate, 120 parts of methyl methacrylate, 3 parts of acrylamide, 6 parts of diisopropylxanthic disulfide and a total of 12 pars of azoisobutyronitrile in 200 parts of a mixture of equal parts by volume of toluene and ethyl glycol acetate is copolymerized in the manner described in Example 1 and a 60% solution of a copolymer having a K value of 19.1 and an OH number of 89 is obtained.

100 parts of the copolymer solution is ground with 50% of rutile (with reference to the total content of binder) after 75 parts of a mixture of equal parts by volume of ethyl glycol acetate and toluene has been added and then mixed with 24.4 parts of a 75% solution of N, N', N''-tris-(isocyanatohexyl)-biuret. The coating composition obtained is sprayed onto sheet iron. Glossy firmly adherent coatings are obtained which after four days at room temperature have a pendulum hardness of eight-five seconds and an Erichsen number of 8.3. After baking at 150° C. for one hour, the coatings acquire a pendulum hardness of 153 seconds and an Erichsen number of 7.8.

EXAMPLE 5

A mixture of 75 parts of S-vinylthioglycol, 165 parts of tert.-butyl acrylate, 60 parts of styrene, 12 parts of diisopropylxanthic disulfide, a total of 12 parts of diisopropylxanthic disulfide, a total of 12 parts of azoisobutyronitrile in 162 parts of ethyl glycol acetate is polymerized as described in Example 1 and a 63.9% solution of a copolymer having a K value of 14.0 and an OH number of 135 is obtained.

100 parts of the 63.9% copolymer solution is mixed with 40 parts of a 5% solution of N,N',N''-tris-(isocyanatohexyl)-biuret, the whole is diluted with 20 parts of toluene and rustfree iron sheeting is coated with the mixture obtained. Coatings are obtained which after seven days at room temperature have a pendulum hardness of 202 seconds and an Erichsen number of 8.6.

100 parts of the 63.9% copolymer solution is ground with 50% of rutile (with reference to the total binder content) after the addition of 60 parts of a mixture of equal parts by volume of ethyl glycol acetate and toluene and mixed with 40 parts of 75% solution of the last mentioned polyisocyanate. The coating composition obtained is sprayed onto sheet iron. High gloss firmly adherent coatings are obtained which after seven days at room temperature have a pendulum hardness of 162 seconds and an Erichsen number of 8.

We claim:
1. A coating composition comprising the reaction product of (A) a polyisocyanate with (B) a copolymer of (1) from 1 to 35% by weight of

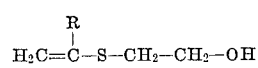  (1)

in which R denotes a hydrogen atom, a methyl group or a vinyl group, and (2) from 65 to 99% by weight of at least one other copolymerizable ethylenically unsaturated compound.

2. A coating composition as claimed in claim 1 wherein the other copolymerizable ethylenically unsaturated compound consists of at least one ester of acrylic or methacrylic acid with an alcohol having 1 to 8 carbon atoms and a minor amount of a member selected from the group consisting of styrene and vinyl acetate.

3. A coating composition as claimed in claim 1 wherein R denotes methyl.

4. A coating composition as claimed in claim 1 wherein R in the general formula denotes a hydrogen atom.

5. A coating composition as claimed in claim 1 wherein said other copolymerizable ethylenically unsaturated compound is an ester of acrylic or methacrylic acid with an alcohol having from 1 to 8 carbon atoms.

6. A coating composition as claimed in claim 1 wherein the copolymer contains from 5 to 25% by weight of said compound (1).

7. A coating composition as claimed in claim 1 wherein the molar ratio of isocyanate groups contained in the polyisocyanate to hydroxyl groups contained in the copolymer is from 1:1.4 to 1.5:1.

References Cited

UNITED STATES PATENTS 3,422,165   1/1969   Brotherton et al. ____ 260—859

FOREIGN PATENTS 602,300   7/1960   Canada _____ 260—77.5UX

DONALD E. CZAJA, Primary Examiner

H. S. COCKERAM, Assistant Examiner

U.S. Cl. X.R.

117—124, 132, 161; 260—31.4, 79.7, 830, 849